(12) United States Patent
Chang

(10) Patent No.: US 7,299,525 B2
(45) Date of Patent: Nov. 27, 2007

(54) SELF-LOCKED HINGE DEVICE

(75) Inventor: Yu-Lun Chang, Tou-Feng Town, Miao-Li County (TW)

(73) Assignee: Avision Inc. (TW)

( * ) Notice: Subject to any disclaimer, the term of this patent is extended or adjusted under 35 U.S.C. 154(b) by 324 days.

(21) Appl. No.: 10/833,008

(22) Filed: Apr. 28, 2004

(65) Prior Publication Data

US 2005/0044664 A1 Mar. 3, 2005

(30) Foreign Application Priority Data

Aug. 27, 2003 (TW) .............................. 92123667 A

(51) Int. Cl.
*E05D 11/10* (2006.01)

(52) U.S. Cl. .......................... 16/327; 16/366; 16/371; 16/346; 16/357; 16/353; 16/377; 16/348; 16/349; 16/350

(58) Field of Classification Search .................. 16/366, 16/367, 371, 327, 357, 353, 377, 352, 348–350; 355/75; 399/379
See application file for complete search history.

(56) References Cited

U.S. PATENT DOCUMENTS

| | | | | |
|---|---|---|---|---|
| 5,564,686 A | * | 10/1996 | Horng | 271/4.01 |
| 5,621,501 A | * | 4/1997 | Matsuo et al. | 355/75 |
| 6,141,832 A | * | 11/2000 | Salice | 16/366 |
| 6,256,837 B1 | * | 7/2001 | Lan et al. | 16/334 |
| 6,347,433 B1 | * | 2/2002 | Novin et al. | 16/367 |
| 6,415,477 B1 | * | 7/2002 | Hosaka et al. | 16/327 |
| 6,427,288 B1 | * | 8/2002 | Saito | 16/361 |
| 6,584,647 B2 | * | 7/2003 | Jacquin | 16/371 |
| 6,629,336 B2 | * | 10/2003 | Hosaka et al. | 16/327 |
| 2003/0159249 A1 | * | 8/2003 | Lin | 16/371 |
| 2005/0257344 A1 | * | 11/2005 | Allen | 16/371 |

* cited by examiner

*Primary Examiner*—Katherine Mitchell
*Assistant Examiner*—Marcus Menezes

(57) ABSTRACT

A self-locked hinge device includes a hinge body, a first mounting plate, a second mounting plate and a locking mechanism, The first mounting plate is hinged to a first end of the hinge body, and the second mounting plate is hinged to a second end of the hinge body. The locking mechanism is driven by the second mounting plate when the second mounting plate is moved and incapacitates the first mounting plate from moving relatively to the hinge body when the second mounting plate is rotated to a predetermined position relative to the hinge body. A multi-function peripheral using the self-locked hinge device is also provided.

4 Claims, 7 Drawing Sheets

SELF-LOCKED HINGE DEVICE

This Non-provisional application claims priority under 35 U.S.C. § 119(a) on Patent Application No. 092123667 filed in Taiwan on Aug. 27, 2003, the entire contents of which are hereby incorporated by reference.

BACKGROUND OF THE INVENTION

1. Field of the Invention

The invention relates to a self-locked hinge device and a multi-function peripheral using the same, and more particularly to a self-locked hinge device with two integrated hinges and a multi-function peripheral using the same.

2. Description of the Related Art

The multi-function peripheral (MFP) is now very popular because it has the functions of scan, print, or even fax. In a conventional MFP, the printing unit is usually located below a scanning unit. The user has to replace the toner or ink cartridge with a new one after the toner or ink has been consumed in either a laser or ink-jet type printing unit. At this time, the user has to lift up the scanning unit so as to perform the replacement operation. Alternatively, when the paper jam situation occurs in the multi-function peripheral, the user also has to lift up the scanning unit so as to overcome this situation.

FIG. 1 is a schematic illustration showing a conventional multi-function peripheral. Referring to FIG. 1, the multi-function peripheral includes a first hinge 101, a second hinge 102, a scanning unit 103, a printing unit 104, a cover 105 and an oil cylinder 106. The first hinge 101 hinges the cover 105 to the scanning unit 103, and the second hinge 102 hinges the scanning unit 103 to the printing unit 104. During the scan operation, the user lifts up the cover 105 by rotating the cover 105 about a rotating shaft of the first hinge 101. Next, the document is placed on the scanning unit 103, and then the cover 105 is closed for scan. When the paper jam occurs in the MFP or the consumable material of the MFP has to be replaced, the user lifts up the scanning unit 103 by rotating it about a rotating shaft of the second hinge 102. At this time, the oil cylinder 106 functions to support the weights of the scanning unit 103 and the cover 105. Then, the paper jam overcoming or consumable material replacing operation may be performed.

However, the above-mentioned prior art has the following drawbacks. Because two hinges have to be mounted independently, the assembling processes are complicated, and thus the cost of the MFP cannot be effectively reduced. In addition, when the user lifts up the scanning unit 103, the slanting cover 105 may separate from the scanning unit 103 or even fall down owing to the gravity force. In this case, the cover 105 and/or the first hinge 101 tend to be damaged. When the automatic document feeder is additionally mounted to the cover 105, the overall weight of the cover 105 is further increased. If the cover 105 falls down owing to the lifting up of the scanning unit 103, the expensive automatic document feeder may be damaged.

Consequently, it is a great advantage in miniaturizing the MFP and reducing the cost thereof if a self-locked hinge device, which is capable of facilitating the assembling processes of the MFP and preventing the cover from separating from the scanning unit that is lifted up, is provided.

SUMMARY OF THE INVENTION

It is therefore an object of the invention to provide a self-locked hinge device capable of facilitating the assembling processes of a multi-function peripheral and effectively preventing the cover from falling down.

The invention achieves the above-mentioned object by providing a self-locked hinge device, which includes a hinge body, a first mounting plate, a second mounting plate and a locking mechanism. The first mounting plate is hinged to a first end of the hinge body, and the second mounting plate is hinged to a second end of the hinge body. The locking mechanism is driven by the second mounting plate when the second mounting plate is moved and incapacitates the first mounting plate from moving relatively to the hinge body when the second mounting plate is rotated to a predetermined position relative to the hinge body.

The invention also achieves the above-mentioned object by providing a multi-function peripheral, which includes the self-locked hinge device, a scanning unit, a printing unit and a cover. The scanning unit mounted to the hinge body is for scanning a to-be-scanned document and generating a printing signal. The printing unit mounted to the second mounting plate is for receiving the printing signal and printing a to-be-printed document. The cover mounted to the first mounting plate is for covering over the to-be-scanned document placed on the scanning unit.

According to the above-mentioned structure, the user can lift up the cover and the scanning unit separately so as to place the sheet or document, replace the consumable material or overcome the paper jam. In addition, when the user lifts up the scanning unit, the cover is locked in order to prevent the cover from falling down, damaging or hurting someone.

DETAILED DESCRIPTION OF THE INVENTION

Figure 1:
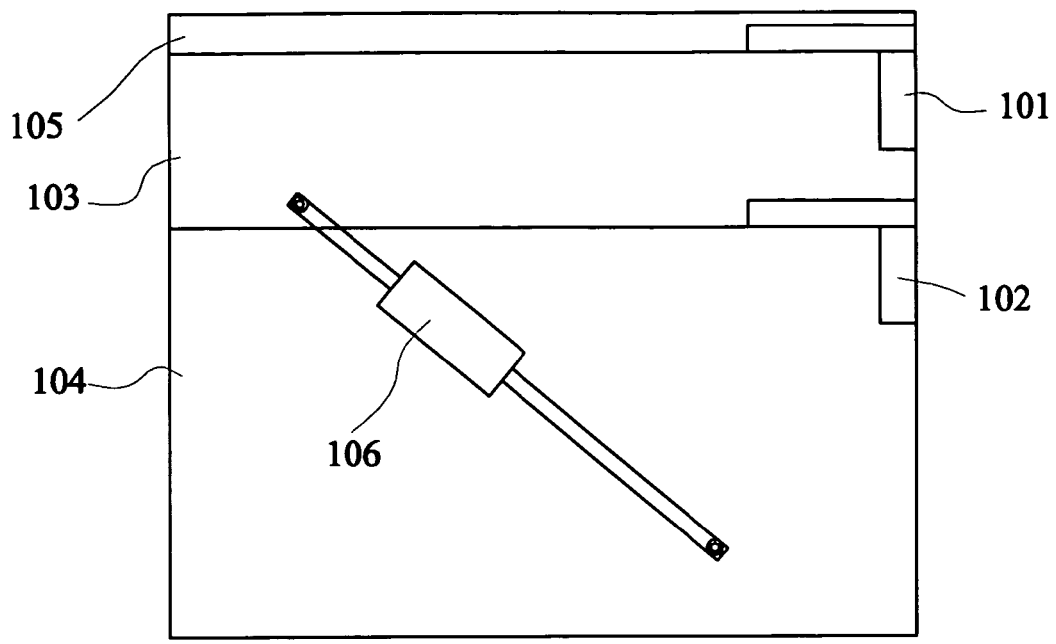
FIG. 1 is a schematic illustration showing a conventional multi-function peripheral.
Figure 2:
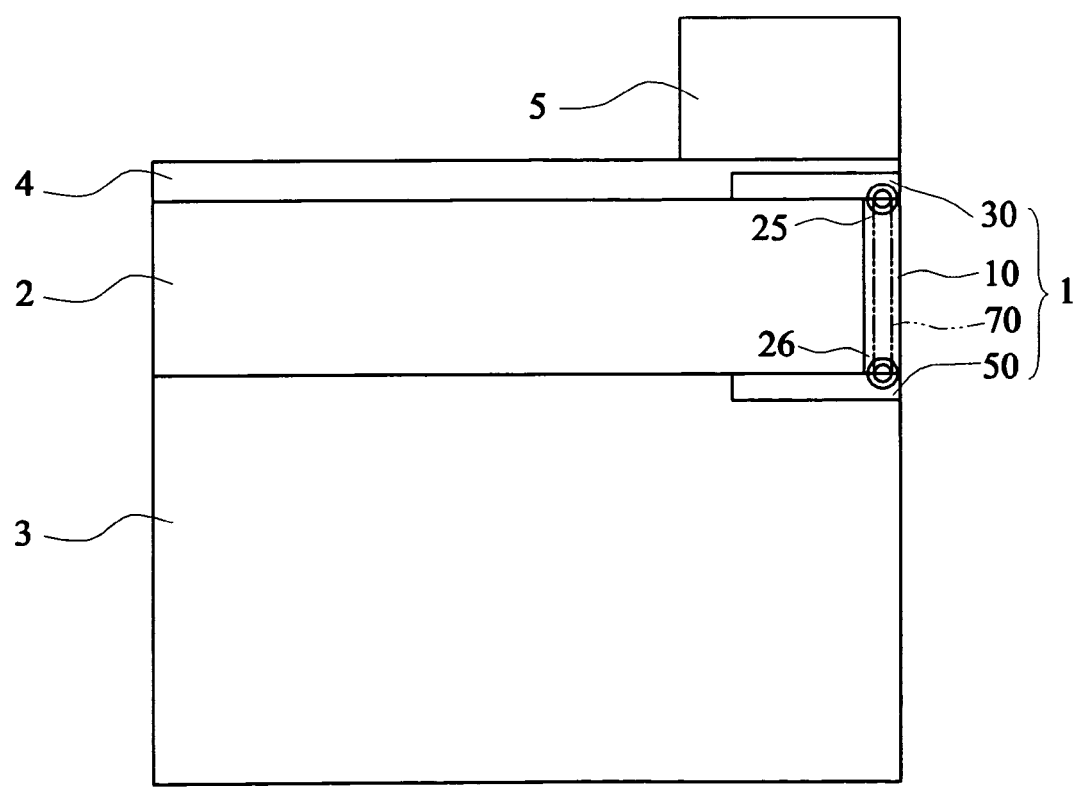
FIG. 2 is a schematic illustration showing a multi-function peripheral according to a preferred embodiment of the invention.
Figure 3:
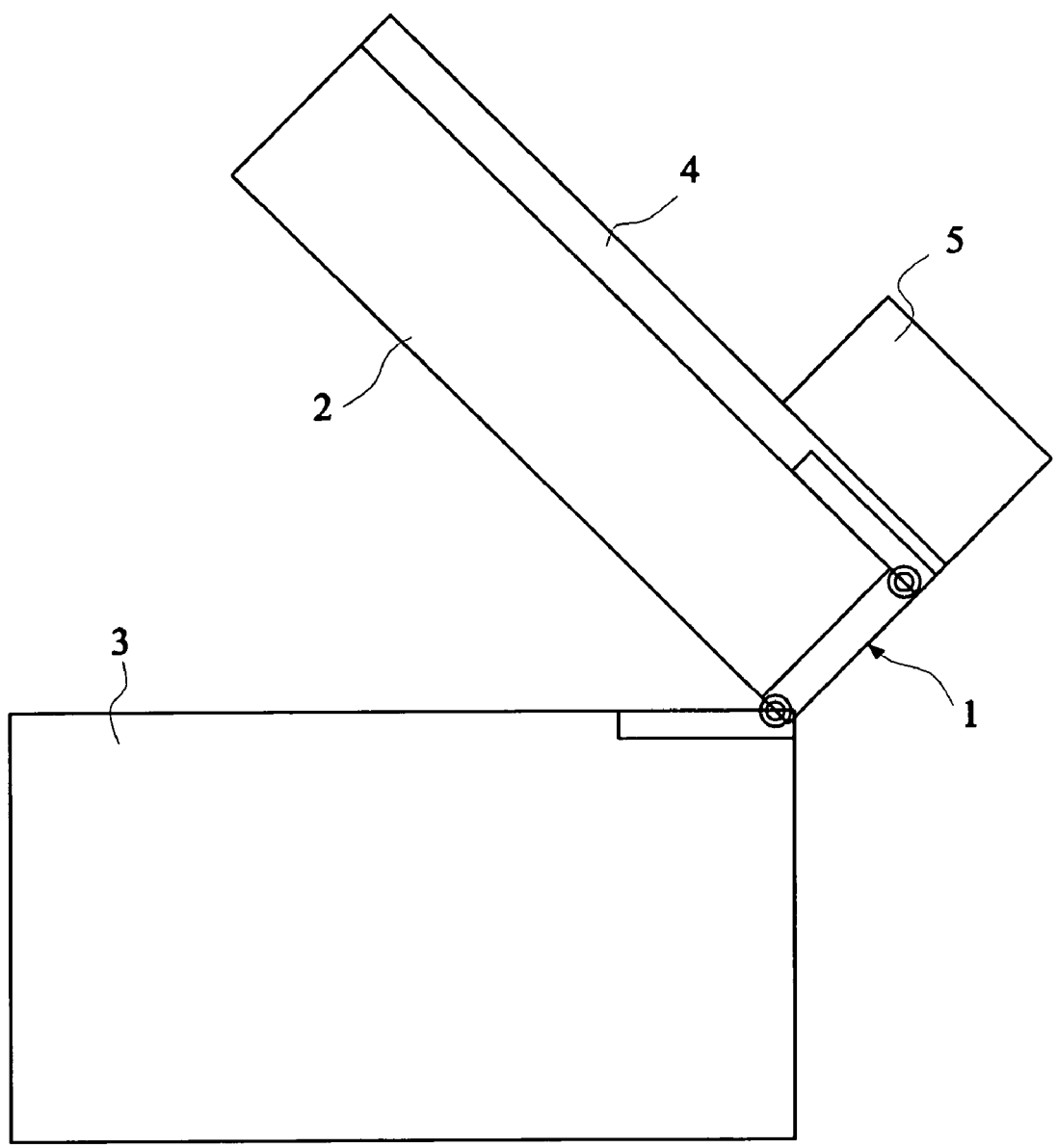
FIG. 3 shows the state when the scanning unit of FIG. 2 is lifted up.
Figure 4:
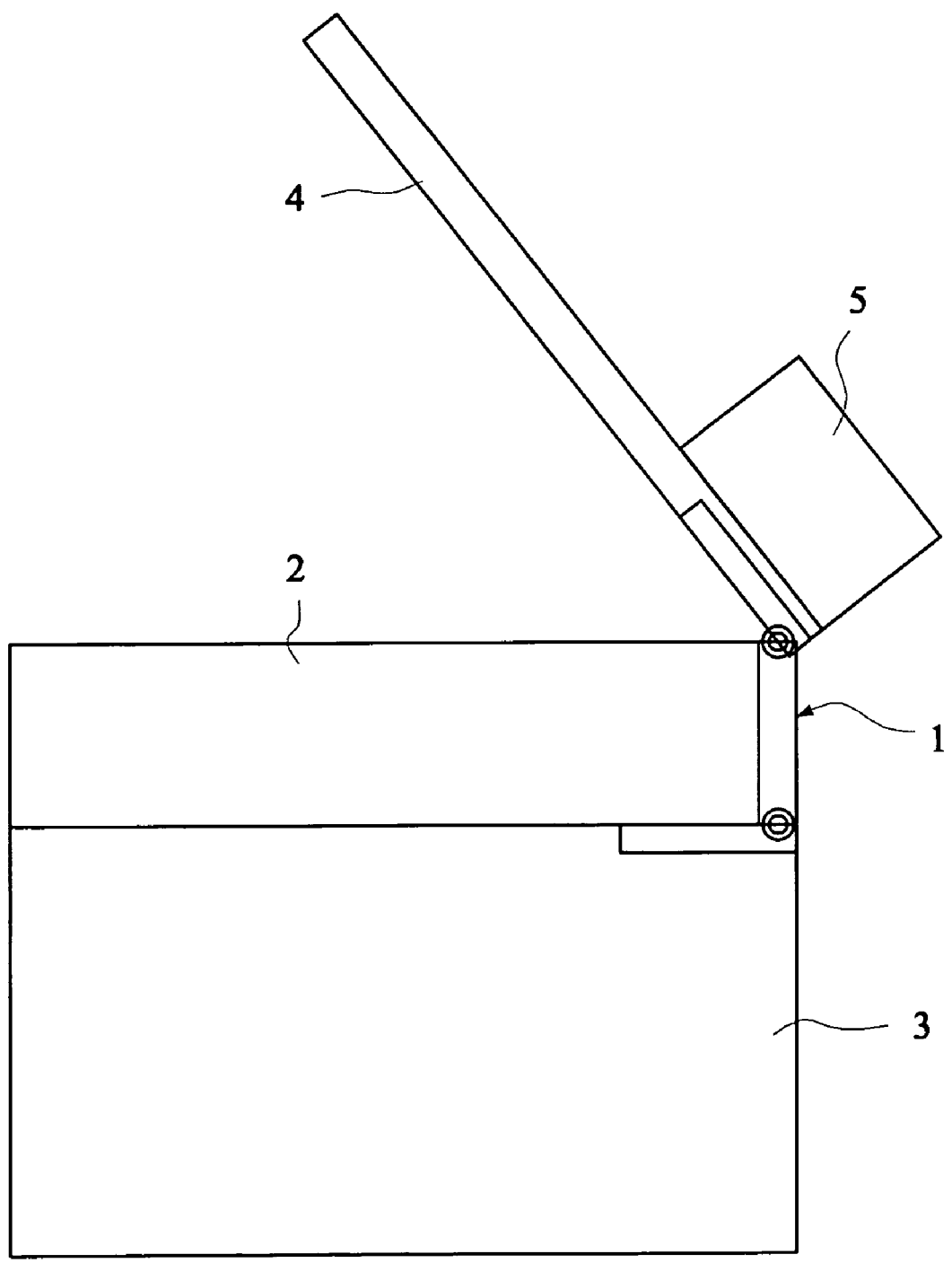
FIG. 4 shows the state when the cover of FIG. 2 is lifted up.

FIG. 2 is a schematic illustration showing a multi-function peripheral according to a preferred embodiment of the invention. FIG. 3 shows the state when the scanning unit of FIG. 2 is lifted up. FIG. 4 shows the state when the cover of FIG. 2 is lifted up. Referring to FIGS. 2 to 4, the multi-function peripheral includes a self-locked hinge device 1, a scanning unit 2, a printing unit 3, a cover 4 and an automatic document feeder 5. It is to be noted that the automatic document feeder 5 may be omitted in some conditions. The self-locked hinge device 1 includes a hinge body 10, a first mounting plate 30, a second mounting plate 50 and a locking mechanism 70. The hinge body 10 has a first end 25 and a second end 26. The first mounting plate 30 is hinged to the first end 25 and the second mounting plate 50 is hinged to the second end 26. The locking mechanism 70 locks the first mounting plate 30 and the hinge body 10 together such that the first mounting plate 30 cannot move relatively to the hinge body 10 when the second mounting plate 50 is rotated to a predetermined position relative to the hinge body 10. For example, the so-called predetermined position represents the position corresponding to the lifted-up state of the scanning unit.

The scanning unit 2 mounted to the hinge body 10 scans a document and generates a printing signal. The document may be placed on a glass window of the scanning unit 2 such that a flatbed scan process may be performed, or placed in the automatic document feeder 5 such that a sheet-fed scan process may be performed. Thus, the scanning unit 2 has a movable scanning module for performing the flatbed scan or sheet-fed scan process. Furthermore, the automatic document feeder 5 may also have another scanning module for performing a duplex scan process in conjunction with the scanning module of the scanning unit 2. Alternatively, the scanning unit 2 may have an image processing module for generating the printing signal. It is to be noted that the scan signal generated by the scanning unit 2 may be transferred to a host computer, which can generate the printing signal and transfer the signal to the printing unit 3 for printing according to this scan signal.

The printing unit 3 mounted to the second mounting plate 50 is for receiving the printing signal and printing a to-be-printed document. The printing unit 3 may be a dot-matrix type printing module, an ink-jet printing module or a laser printing module. The consumable materials of these printing modules have to be refilled or replaced. Thus, the printing unit 3 has to be hinged to the scanning unit 2 so that the user may lift up the scanning unit 2 and replace the consumable material, refill the consumable material, overcome the paper jam, or maintain the MFP.

The cover 4 mounted to the first mounting plate 30 is for covering over the to-be-scanned document placed on the scanning unit 2. The automatic document feeder 5 mounted onto the cover 4 is for feeding the to-be-scanned document for the scanning unit 2 to scan. In order to prevent the cover from falling down when the scanning unit is lifted up, the self-locked hinge device 1 needs to have the locking mechanism 70 for locking the first mounting plate 30 and the hinge body 10 together to such that the first mounting plate 30 cannot move relatively to the hinge body 10 when the second mounting plate 50 is rotated to a predetermined position relative to the hinge body 10. The detailed structure of this self locked hinge device 1 will be described in the following.

Figure 6:
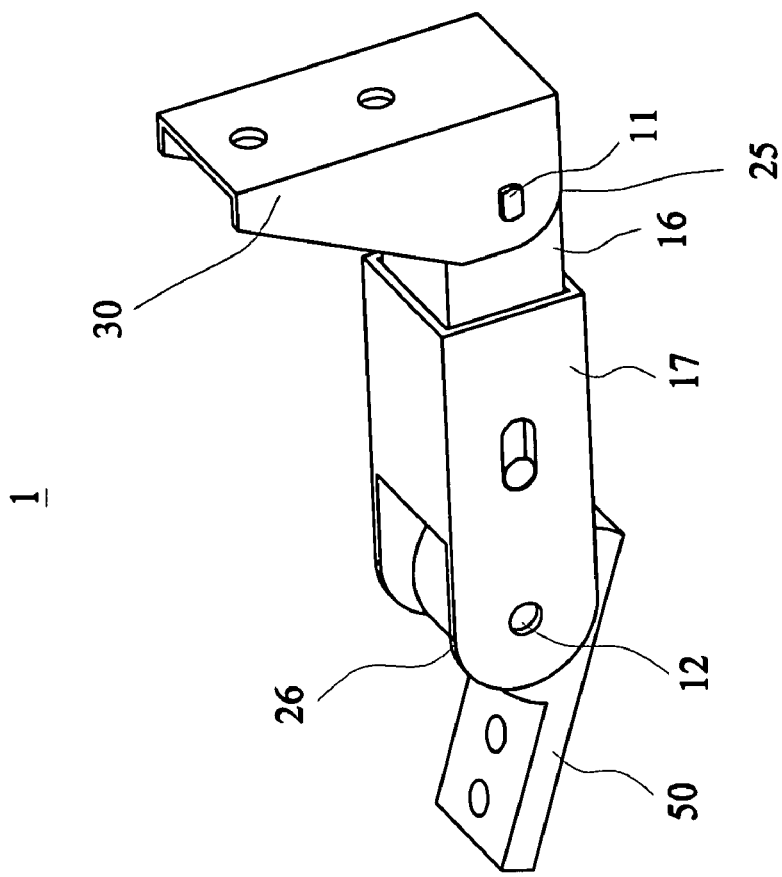
FIG. 6 is a pictorial view showing another state of the self-locked hinge device according to the first embodiment of the invention.
Figure 5:
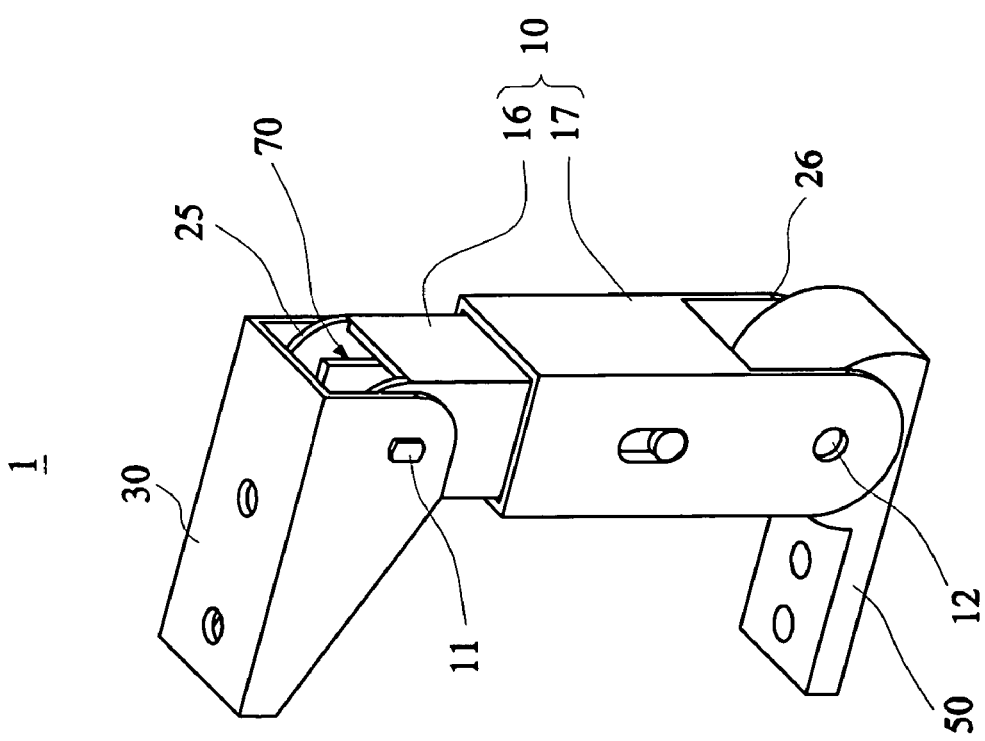
FIG. 5 is a pictorial view showing one state of a self-locked hinge device according to a first embodiment of the invention.

FIGS. 5 and 6 are pictorial views showing two states of a self-locked, hinge device according to a first embodiment of the invention. Referring to FIGS. 5 and 6, this self-locked hinge device 1 includes the above-mentioned hinge body 10, first mounting plate 30, second mounting plate 50 and locking mechanism 70. The first mounting plate 30 is hinged to the hinge body 10 using a first hinge shaft 11, and the second mounting plate 50 is hinged to the hinge body 10 using a second hinge shaft 12. The hinge body 10 is composed of a first body 16 and a second body 17 in order to facilitate the assembling processes. However, the first body 16 and the second body 17 also may be integrally formed into a one-piece structure. In this embodiment, the first hinge shaft 11 and the second hinge shaft 12 are located on the same plane. That is, the first mounting plate 30 may be rotated to a state in parallel to and facing the second mounting plate 50, as shown in FIG. 5. When the second mounting plate 50 is rotated to a predetermined position relative to the hinge body 10, as shown in FIG. 6, both the first mounting plate 30 and the hinge body 10 are locked together and have no relative rotation therebetween in order to prevent the cover mounted to the first mounting plate 30 from falling down. That is, the locking mechanism 70 is driven by the second mounting plate 50 when the second mounting plate 50 is moved and incapacitates the first mounting plate 30 from moving relatively to the hinge body 10. There are many ways for implementing the locking mechanism 70. For example, the electrical force, magnetic force or mechanical force may be utilized. The detailed structure of the locking mechanism 70 will, be described according to an illustrative but non-limiting example.

Figure 7:
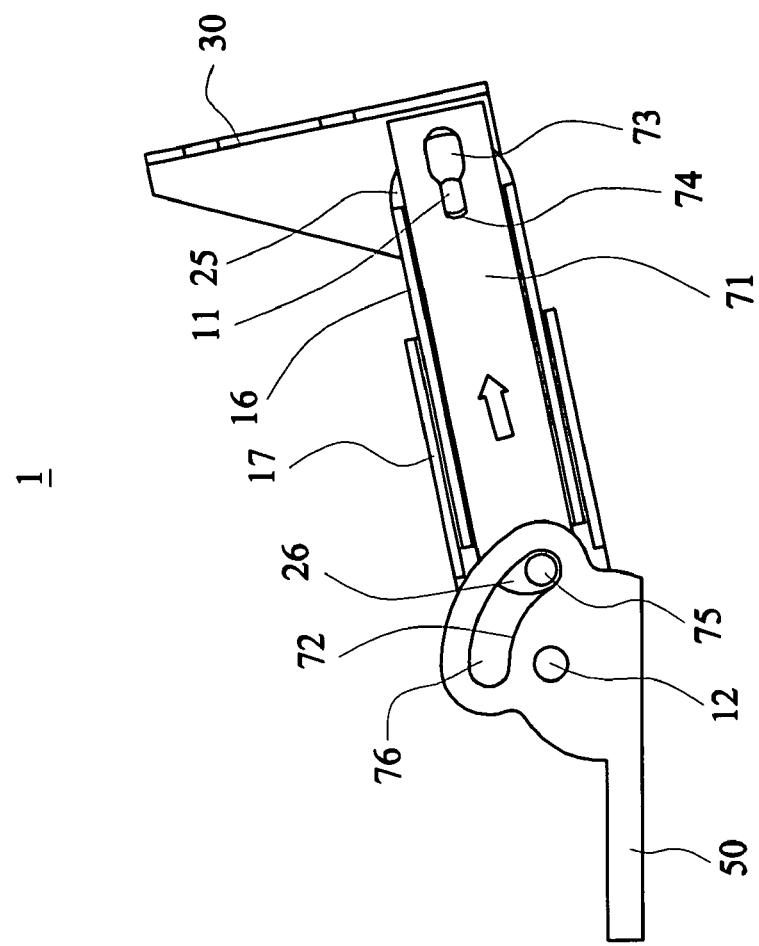
FIG. 7 is a side view showing one state of a self-locked hinge device according to a second embodiment of the invention.
Figure 8:
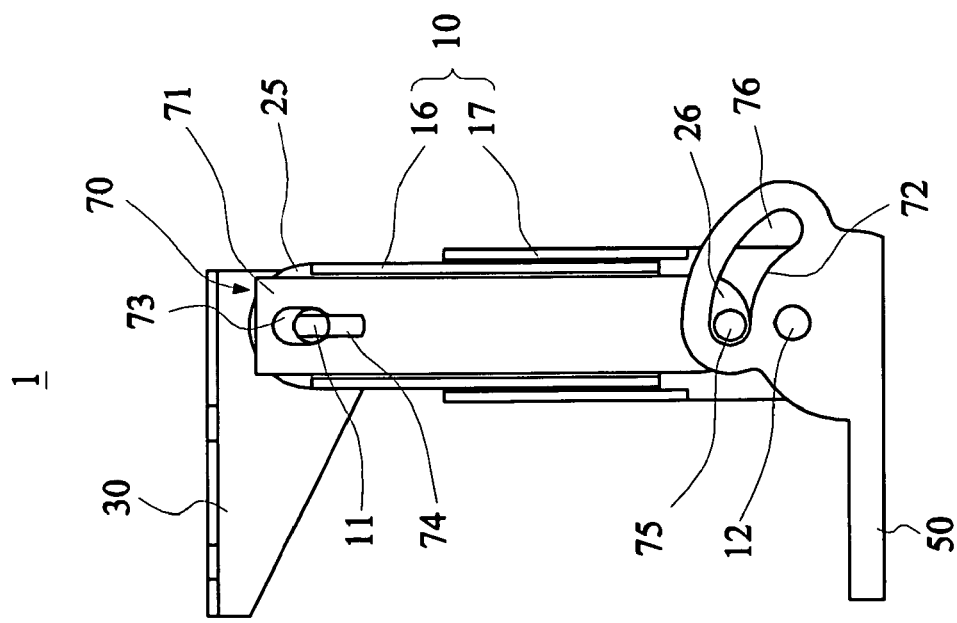
FIG. 8 is a side view showing another state of the self-locked hinge device according to the second embodiment of the invention.

FIGS. 7 and 8 are side views showing two states of a self-locked hinge device according to a second embodiment of the invention. This embodiment is similar to the first embodiment, and descriptions of the repeated portions thereof will be omitted. Referring to FIGS. 7 and 8, the self-locked hinge device 1 includes the above-mentioned hinge body 10, first mounting plate 30, second mounting plate 50 and locking mechanism 70, wherein the locking mechanism 70 includes a follower link 71 and a cam 72. The follower link 71, which moves with the relative rotation between the second mounting plate 50 and the hinge body 10, is for selectively fixing the first hinge shaft 11. The cam 72 mounted to the second mounting plate 50 is for contacting and moving the follower link 71. A pin 75 is mounted to the follower link 71 and is movable in a guiding slot 76 of the form-closed cam 72. Controlling the profile of the guiding slot 76 can effectively control the displacement of the follower link 71.

The follower link 71 is formed with a circular or an elliptic first opening 73 and a rectangular second opening 74 in communication with the first opening 73. The first hinge shaft 11 may have two cambers and two planes and is thus capable of rotating in the first opening 73 but incapable of rotating in the second opening 74. When the state of the self-locked hinge device 1 is that as shown in FIG. 7, the first hinge shaft 11 is within the first opening 73, so the first mounting plate 30 can rotate relative to the hinge body 10. When the state of the self-locked hinge device 1 is that as shown in FIG. 8, the hinge body 10 moves in an arrow direction so as to make the first hinge shaft 11 slide into the second opening 74. Thus, both the first mounting plate 30 and the hinge body 10 may be locked together, and the effect of the invention is thus achieved.

Figure 9:
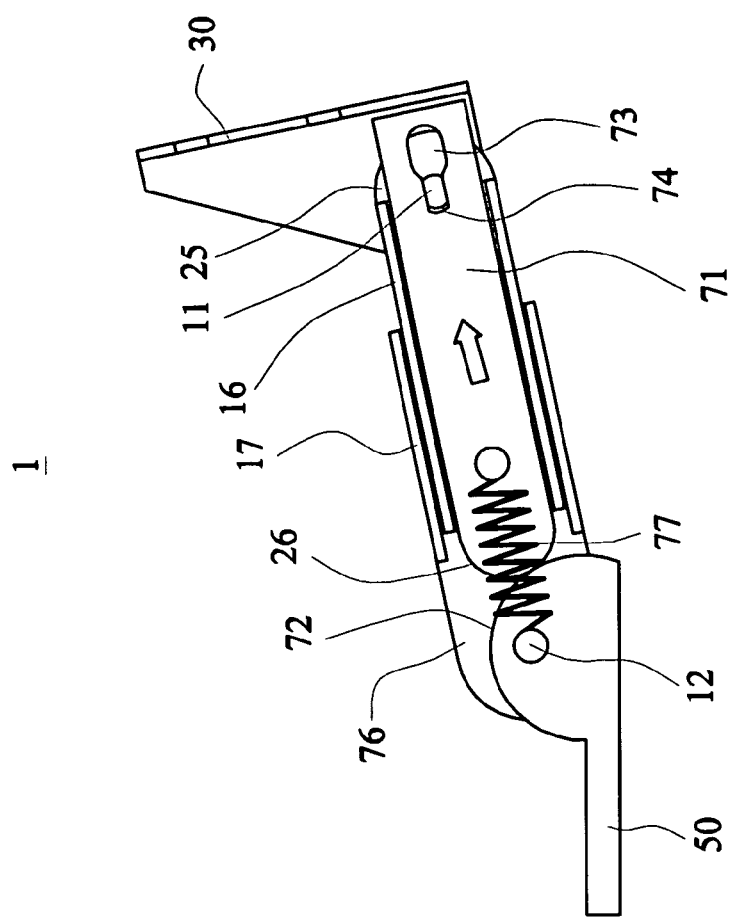
FIG. 9 is a side view showing one state of a self-locked hinge device according to a third embodiment of the invention.
Figure 10:
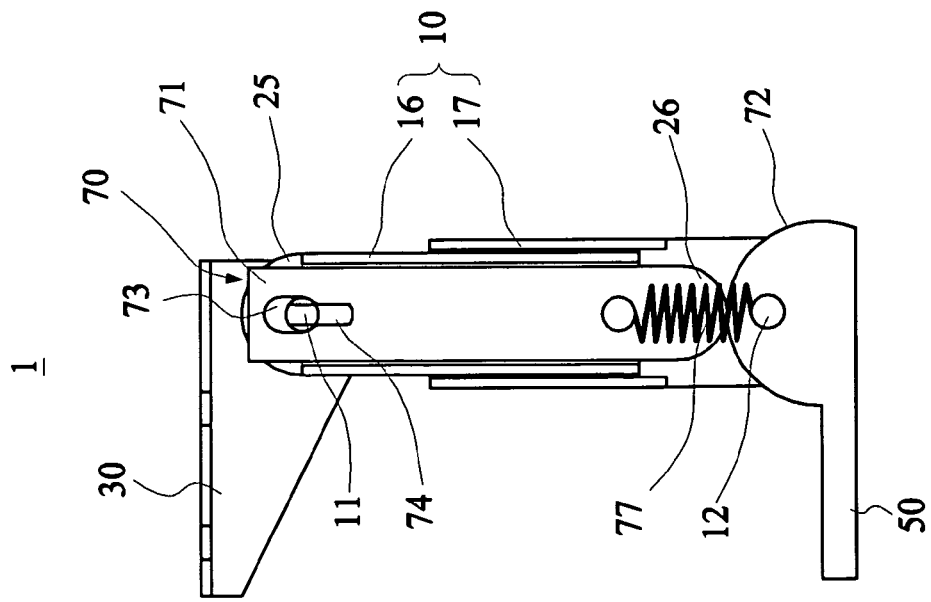
FIG. 10 is a side view showing another state of the self-locked hinge device according to the third embodiment of the invention.

FIGS. 9 and 10 are side views showing two states of a self-locked hinge device according to a third embodiment of the invention. This embodiment is similar to the first embodiment, and descriptions of the repeated portions thereof will be omitted. Referring to FIGS. 9 and 10, the self-locked hinge device 1 includes the above-mentioned hinge body 10, first mounting plate 30, second mounting plate 50 and locking mechanism 70, wherein the locking mechanism 70 includes a follower link 71, a cam 72 and a spring 77. The cam 72 is a force-closed cam, and the spring 77 connects the follower link 71 to the cam 72 in order to keep the follower link 71 always in contact with the cam 72. Other members and operational manners are similar to those of the second embodiment, and detailed descriptions thereof will be omitted.

Figure 11:
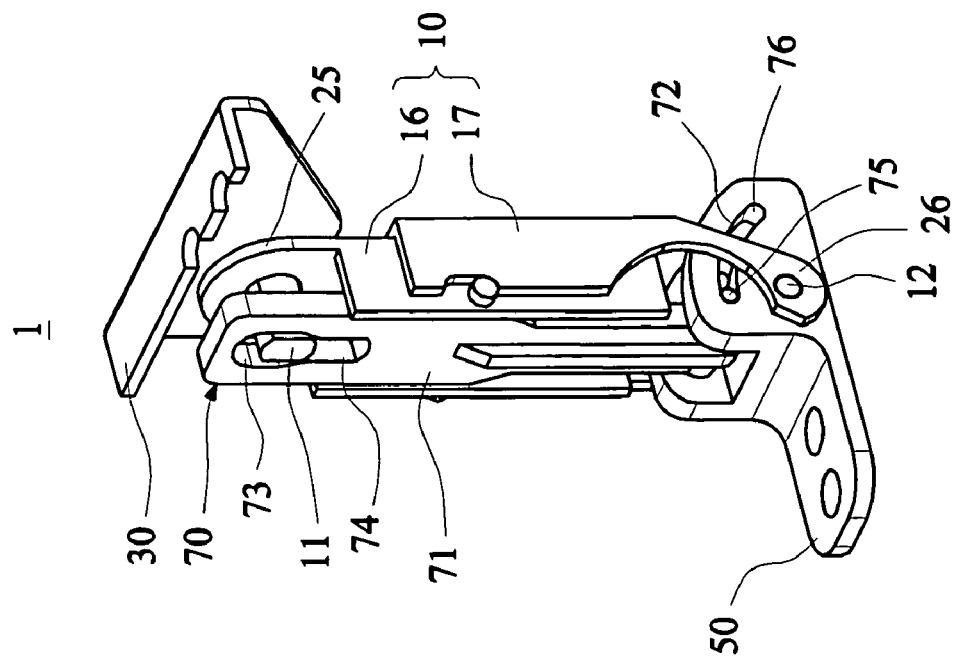
FIG. 11 is a pictorial view showing a self-locked hinge device according to a fourth embodiment of the invention.
Figure 12:
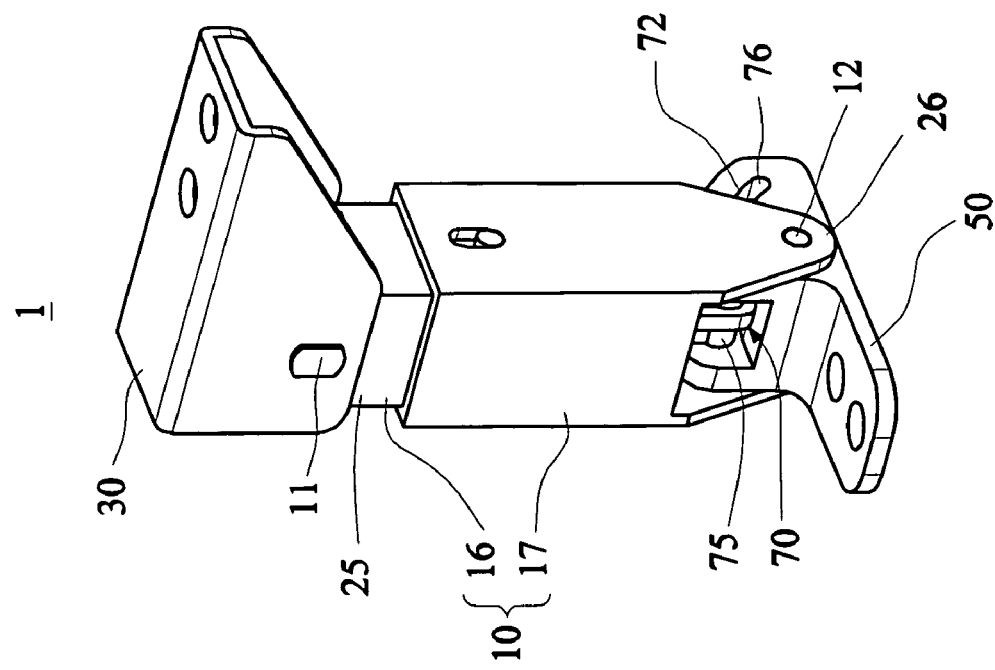
FIG. 12 shows the interior structure of FIG. 11.

FIG. 11 is a pictorial view showing a self-locked hinge device according to a fourth embodiment of the invention. FIG. 12 shows the interior structure of FIG. 11. This embodiment is also similar to the second embodiment and descriptions of the repeated portions thereof will be omitted. As shown in FIGS. 11 and 12, the fourth embodiment is similar to the second embodiment but differs from the second embodiment in that the first hinge shaft 11 between the first mounting plate 30 and the hinge body 10 and the second hinge shaft 12 between the second mounting plate 50 and the hinge body 10 are located on different planes. The lifting directions for the cover and scanning unit of the multi-function peripheral mounted with the self-locked hinge device 1 are different, and this architecture also may be applied to the first to third embodiments. It is to be noted that one self-locked hinge device according to the fourth embodiment may be used in conjunction with two self-locked hinge devices according to the first, second or third embodiment such that the lifting directions of the scanning unit and the cover of the multi-function peripheral are different.

According to the above-mentioned structure of the invention, it is possible to provide a self-locked hinge device capable of facilitating the assembling processes of a multi-function peripheral and effectively preventing the cover from falling down. When the multi-function peripheral is assembled, the desired operations may be achieved by mounting only one set of self-locked hinge device. In addition, when the scanning unit of the multi-function peripheral is lifted up, the self-locked hinge device can prevent the cover from falling down so as to protect the user in a safe condition and avoid the damage of the multi-function peripheral.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A self-locked hinge device, comprising:
a hinge body having a first end and a second end;
a first mounting plate hinged to the first end;
a second mounting plate hinged to the second end; and
a locking mechanism, driven by the second mounting plate when the second mounting plate is moved, for incapacitating the first mounting plate from moving relatively to the hinge body when the second mounting plate is rotated to a predetermined position relative to the hinge body, wherein;
a first hinge shaft between the first mounting plate and the hinge body and a second hinge shaft between the second mounting plate and the hinge body are located on the same plane;
the locking mechanism comprises:
a follower link, which moves with a relative rotation between the second mounting plate and the hinge body, for selectively fixing the first hinge shaft; and
a cam, which is mounted to the second mounting plate, for contacting and moving the follower link;
the cam is a form-closed cam; and
the follower link is formed with a first opening and a second opening in communication with the first opening, and the first hinge shaft is capable of rotating in the first opening but incapable of rotating in the second opening.

2. A self-locked binge device comprising:
a hinge body having a first end and a second end;
a first mounting plate hinged to the first end;
a second mounting plate hinged to the second end; and
a locking mechanism, driven by the second mounting plate when the second mounting plate is moved, for incapacitating the first mounting plate from moving relatively to the hinge body when the second mounting plate is rotated to a predetermined position relative to the hinge body, wherein:
a first hinge shaft between the first mounting plate and the hinge body and a second hinge shaft between the second mounting plate and the hinge body are located on the same plane;
the locking mechanism comprises:
a follower link, which moves with a relative rotation between the second mounting plate and the hinge body for selectively fixing the first hinge shaft; and
a cam, which is mounted to the second mounting plate, for contacting and moving the follower link:
the locking mechanism further comprises a spring connecting the follower link to the cam, which is a force-closed cam: and
the follower link is formed with a first opening and a second opening in communication with the first opening, and the first hinge shaft is capable of rotating in the first opening but incapable of rotating in the second opening.

3. A self-locked hinge device, comprising:
a hinge body having a first end and a second end;
a first mounting plate hinged to the first end;
a second mounting plate hinged to the second end; and
a locking mechanism, driven by the second mounting plate when the second mounting plate is moved, for incapacitating the first mounting plate from moving relatively to the hinge body when the second mounting plate is rotated to a predetermined position relative to the hinge body, wherein;
a first hinge shaft between the first mounting plate and the hinge body and a second hinge shaft between the second mounting plate and the hinge body are located on different planes;
the locking mechanism comprises:
a follower link, which moves with a relative rotation between the second mounting plate and the hinge body, for selectively fixing the first hinge shaft; and
a cam, which is mounted to the second mounting plate, for contacting and moving the follower link;
the cam is a form-closed cam; and
the follower link is formed with a first opening and a second opening in communication with the first opening, and the first hinge shaft is capable of rotating in the first opening but incapable of rotating in the second opening.

4. A self-locked hinge device, comprising:
a hinge body having a first end and a second end;
a first mounting plate hinged to the first end;
a second mounting plate hinged to the second end; and
a locking mechanism, driven by the second mounting plate when the second mounting plate is moved, for incapacitating the first mounting plate from moving relatively to the hinge body when the second mounting plate is rotated to a predetermined position relative to the hinge body, wherein:

a first hinge shaft between the first mounting plate and the hinge body and a second hinge shaft between the second mounting plate and the hinge body are located on different planes;

the locking mechanism comprises:

a follower link, which moves with a relative rotation between the second mounting plate and the hinge body, for selectively fixing the first hinge shaft; and a cam, which is mounted to the second mounting plate, for contacting and moving the follower link;

the locking mechanism further comprises a spring connecting the follower link to the cam, which is a force-closed cam; and the follower link is fanned with a first opening and a second opening in communication with the first opening, and the first hinge shaft is capable of rotating in the first opening but incapable of rotating in the second opening.

* * * * *